June 4, 1935.  T. E. BURKHARDT  2,003,627
LIFTING AND PROPELLING MECHANISM FOR VEHICLES
Filed Aug. 22, 1932    5 Sheets-Sheet 1
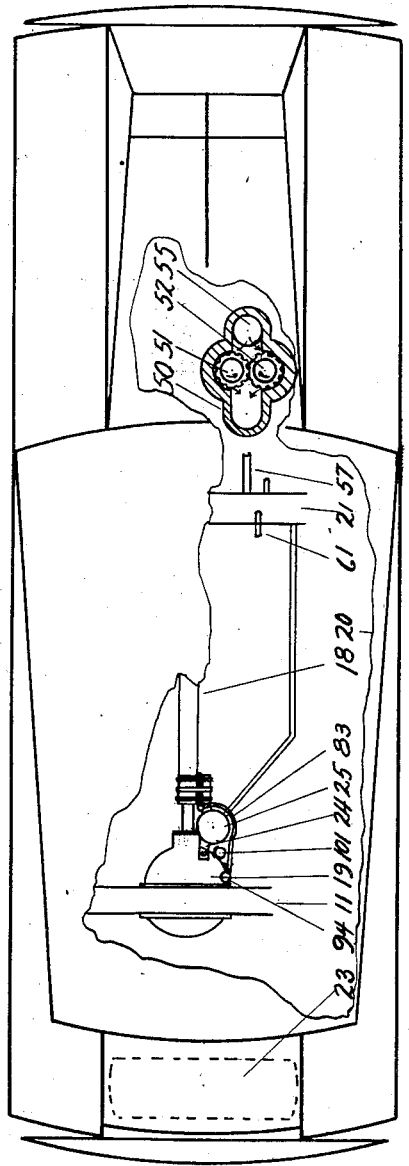
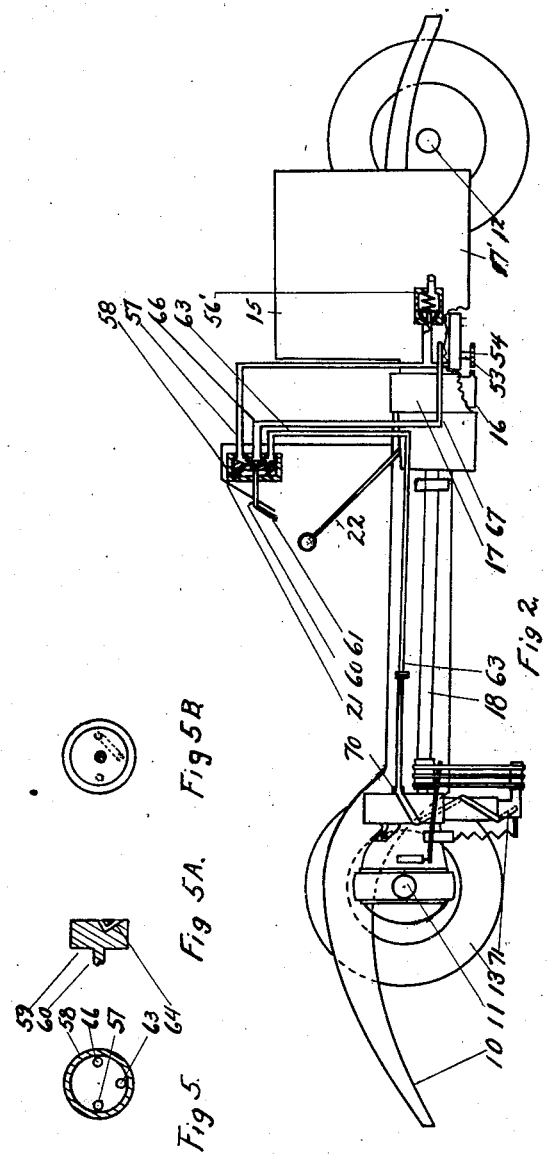
INVENTOR
Thomas E. Burkhardt
BY
Alice Whitson Epperson
ATTORNEY June 4, 1935.  T. E. BURKHARDT  2,003,627
LIFTING AND PROPELLING MECHANISM FOR VEHICLES
Filed Aug. 22, 1932  5 Sheets-Sheet 2
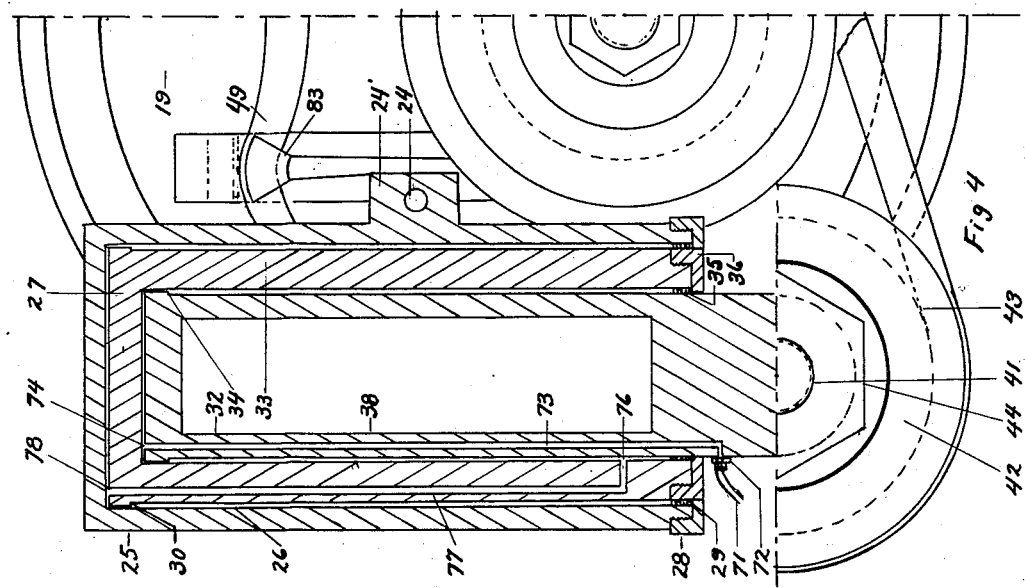
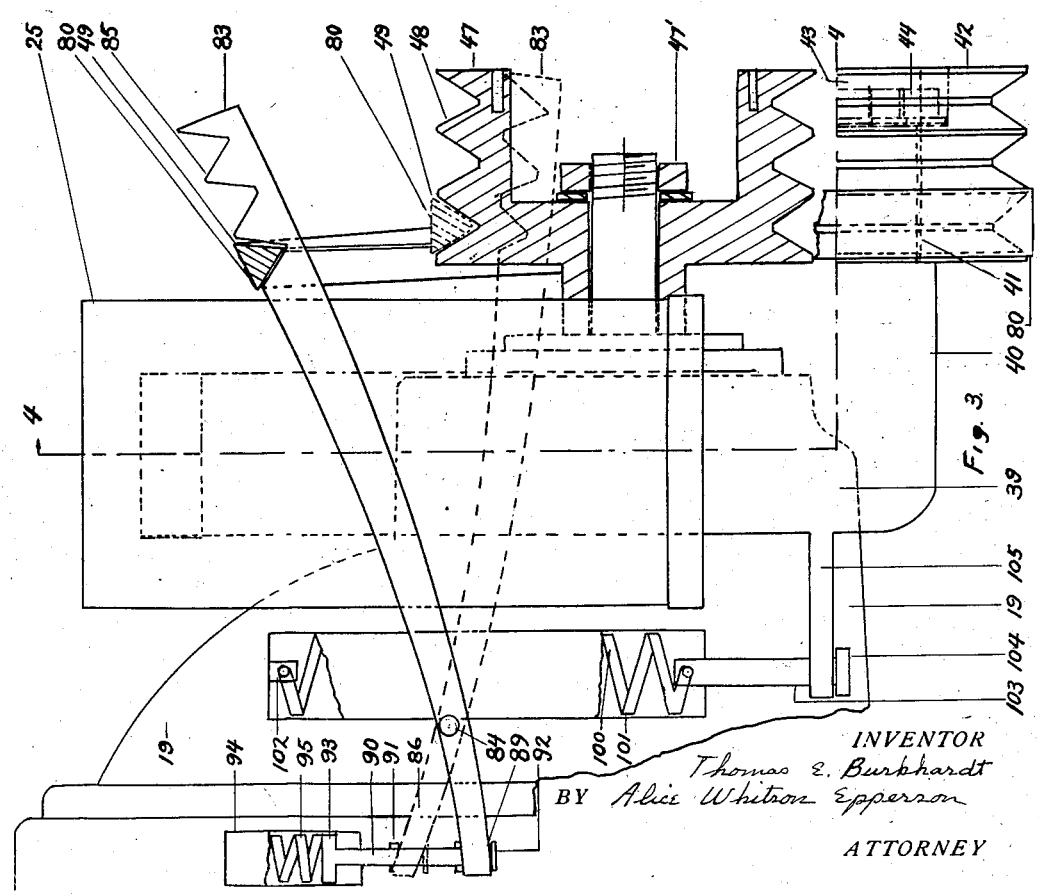
INVENTOR
Thomas E. Burkhardt
BY Alice Whitson Epperson
ATTORNEY

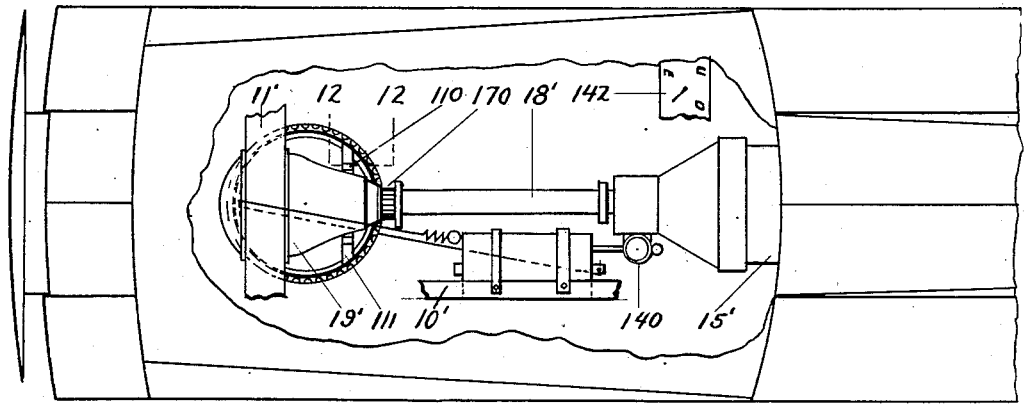
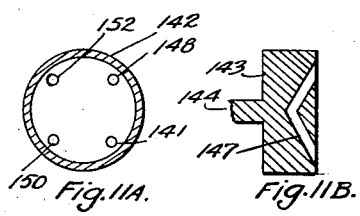
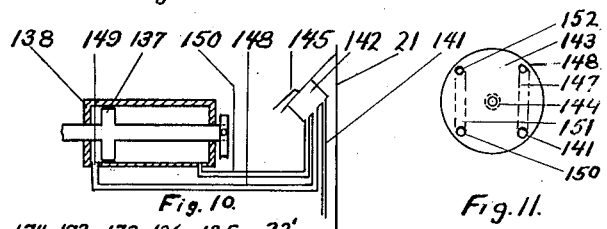
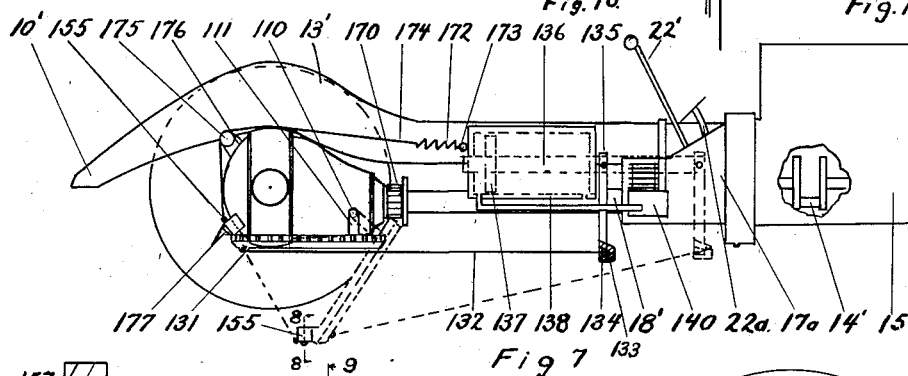
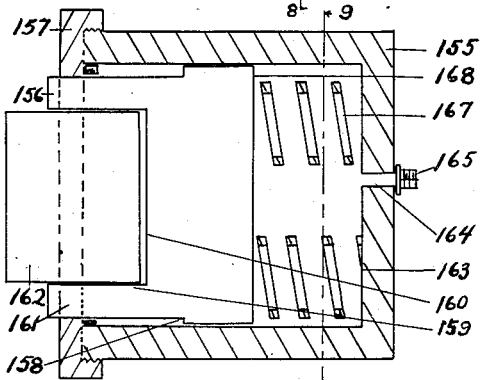
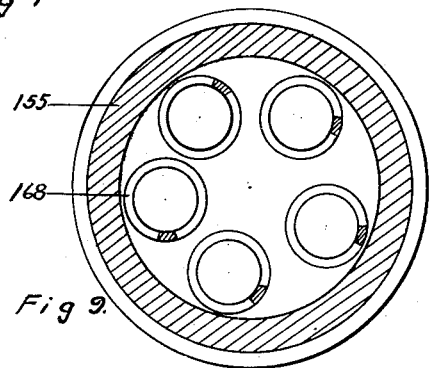

June 4, 1935.  T. E. BURKHARDT  2,003,627
LIFTING AND PROPELLING MECHANISM FOR VEHICLES
Filed Aug. 22, 1932  5 Sheets-Sheet 4
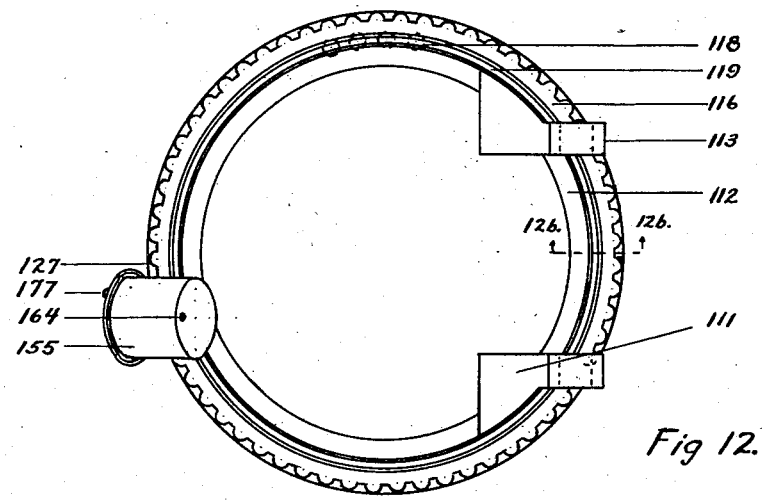
Fig 12.
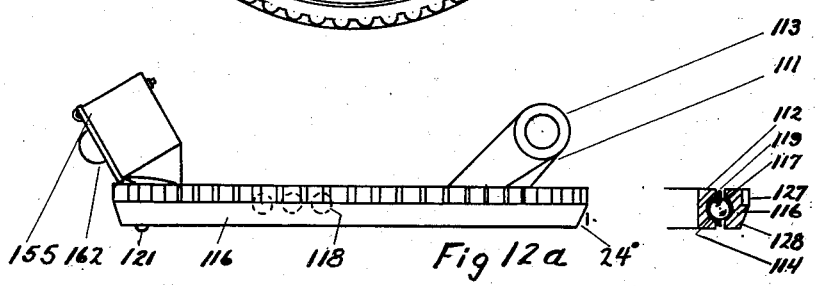 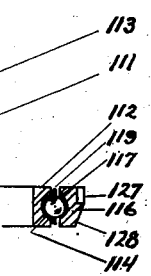
Fig 12a.  Fig 12.b.
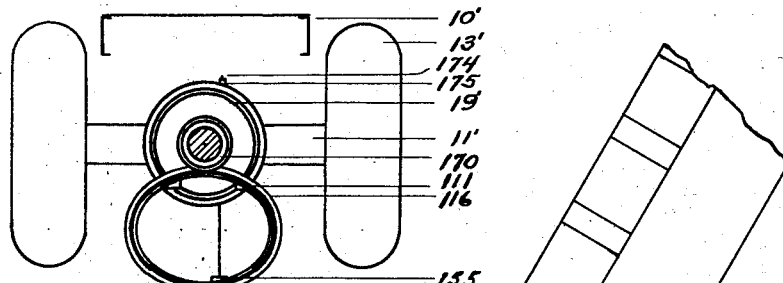
Fig. 13.
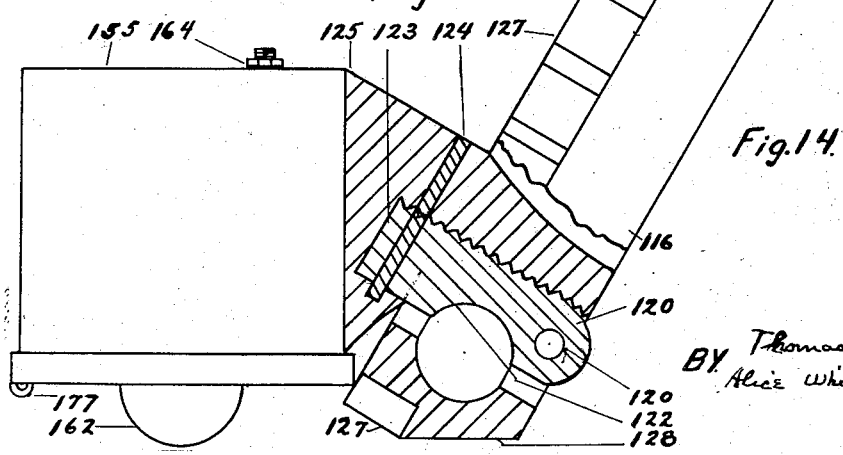
Fig. 14.
INVENTOR
Thomas E. Burkhardt
BY Alice Whitson Epperson
ATTORNEY June 4, 1935.  T. E. BURKHARDT  2,003,627
LIFTING AND PROPELLING MECHANISM FOR VEHICLES
Filed Aug. 22, 1932   5 Sheets-Sheet 5
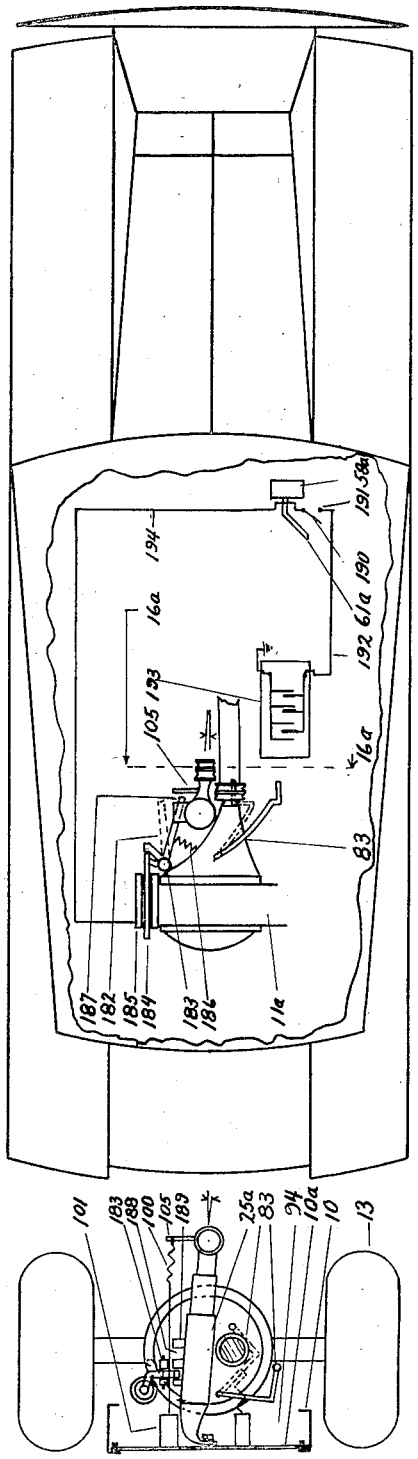
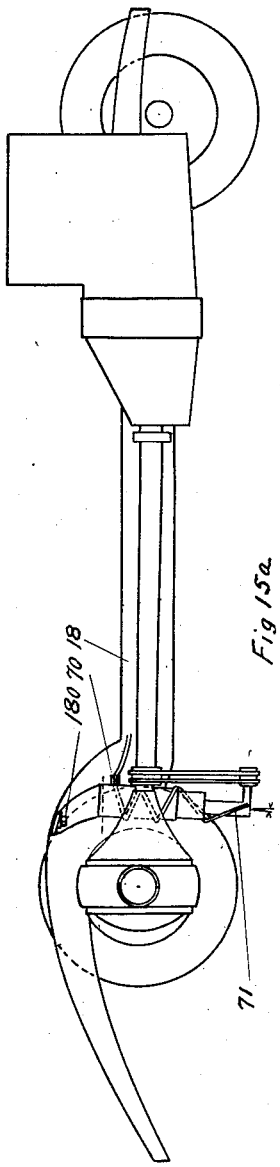
INVENTOR
Thomas E. Burkhardt
BY Alice Whitson Epperson
ATTORNEY Patented June 4, 1935

2,003,627

UNITED STATES PATENT OFFICE 2,003,627

LIFTING AND PROPELLING MECHANISM
FOR VEHICLES

Thomas E. Burkhardt, Dayton, Ohio

Application August 22, 1932, Serial No. 629,813

28 Claims. (Cl. 180—1)

This invention relates to a vehicle lifting and propelling mechanism, and more particularly to a device of this character for facilitating parking of the vehicle and turning in narrow lanes.

One of the principal objects of the invention is to provide self contained apparatus of this character in a vehicle, which is simple and economical in construction, highly effective and easily controlled in operation, which utilizes the motive power of the vehicle for effecting the lifting and propelling operation, and which is composed of few and inexpensive parts providing high economy in initial cost, and which have long life to afford low maintenance cost.

Another object of the invention is to provide in apparatus of this character a hydraulically operated lifting mechanism which affords a lift of substantial extent with mechanism of comparatively small over-all size, and which can be normally retained in inoperative position on the vehicle at a height sufficient to provide desired ground clearance.

Another object of the invention is to provide apparatus of this character having propelling or lateral shifting mechanism for the vehicle in lifted position which is simple and inexpensive in construction, and which affords high traction and provides an easy cushioned movement of the vehicle even over comparatively rough surface.

Still another object of the invention is to provide such a lifting and propelling mechanism for a vehicle in which the use of parts which are subject to rapid deterioration or mechanical failure, such as clutches and gears, are minimized or avoided, which has small weight, and which is easy to install in standard makes of vehicles.

Other objects and advantages of the invention will be apparent from the following description, the accompanying drawings and appended claims.

In the drawings, in which like characters of reference are used to denote like parts throughout the several views thereof—

Fig. 1 is a plan view of an automobile, with parts broken away and in section, in order to illustrate the application and construction of the device of the present invention;

Fig. 2 is a side elevation of the vehicle of Fig. 1, with parts of the vehicle omitted and other parts broken away and in section for the sake of clearness in illustration;

Fig. 3 is a side elevational view on an enlarged scale of the lifting and propelling mechanism of Figs. 1 and 2 mounted on the rear axle of the vehicle;

Fig. 4 is a vertical sectional view taken on the plane of the line 4—4 of Fig. 3 which is a broken section line to pass through the bolt hole mounting;

Fig. 5 is a sectional view through the control valve casing for the hydraulic lifting mechanism, the valve being shown removed from its casing;

Fig. 5a is a vertical sectional view through the control valve removed from its casing;

Fig. 5b is a side elevational view of the control valve and casing with the cover removed;

Fig. 6 is a diagrammatic plan view illustrating another modified form of the invention;

Fig. 7 is a side elevational view of the device of Fig. 6;

Fig. 8 is a vertical sectional view taken on the plane of the line 8—8 of Fig. 7;

Fig. 9 is a sectional view taken on the plane of the line 9—9 of Fig. 8;

Fig. 10 is a diagrammatic view with parts in section of the hydraulic lift and valve control for the device of Fig. 6;

Fig. 11 is a side elevational view of the valve of Fig. 10, shown removed from its casing;

Fig. 11a is a sectional view through the valve casing of Fig. 10, with the valve removed from the casing;

Fig. 11b is a vertical sectional view through the valve of Fig. 10, shown removed from its casing;

Fig. 12 is a plan view of the fifth wheel shown in Fig. 6, detached from the car;

Fig. 12a is a side elevational view of the fifth wheel of Fig. 12;

Fig. 12b is a partial vertical sectional view through the fifth wheel, taken on the plane of the line 12b—12b of Fig. 12;

Fig. 13 is a rear elevational view, with parts broken away and in section, of the vehicle of Fig. 6, when mounted on the fifth wheel;

Fig. 14 is a detail view, with parts broken away and in section, of the portion of the fifth wheel of Fig. 6 carrying the cushioning piston;

Fig. 15 is a partial plan view of a form of the invention in which the lifting mechanism is mounted on the frame, and includes a locking device between the frame and axle or differential housing;

Fig. 15a is a side elevation of a vehicle with the device of Fig. 15 mounted thereon; and Fig. 16 is a transverse sectional view taken on the plane of the line 16—16 of Fig. 15.

Referring to the drawings, in which are disclosed preferred embodiments of the invention, the frame of an automotive vehicle is indicated at 10, with rear axle 11, front axle 12, and normal running wheels 13. Mounted on the frame is the engine 15, whose crankshaft (not shown) drives through conventional transmission mechanism including a flywheel 16, enclosed within a housing 17, a drive shaft 18, which in turn drives through conventional differential mechanism enclosed within the differential housing 19, to the rear wheels. The body of the car is indicated at 20, with dash at 21, conventional gear shift lever in the driver's compartment at 22, and spare tire carrier and tire at 23. No attempt has been made to illustrate in detail the construction of the parts of the vehicle, as any conventional construction of vehicle can be equipped with this device, the illustration being sufficient to show the mounting and general proportioning of the parts of the device on a vehicle of standard make.

Bolted to the frame, or as shown to the differential housing 19 by bolt 24, and at one side thereof, is a block 24' carrying a cylinder 25, having an interior bore 26, within which is slidably mounted an outer piston 27. Cylinder 25 carries at the lower end thereof a threaded ring 28, having an inwardly projecting portion supporting an annular packing 29, which extends within the bore 26, and cooperates with an offset shoulder 30 formed at the upper end of the piston 27 to provide a stop limiting the downward travel of this outer piston. An inner piston 32 is in turn movably mounted for rectilinear motion within the interior bore 33 of outer piston 27, and has an offset shoulder 34 at the upper end thereof which cooperates with annular packing 35 carried by a threaded ring 36, fastened to the lower end of piston 27, to thereby form a stop for limiting the downward movement of the inner piston.

Inner piston 32 is hollow as shown at 38, to provide lightness, and is integrally connected at the lower end thereof with a downwardly extending cylindrical portion 39, which is formed with an outwardly offset extension 40, positioned below the lower extremities of cylinder 25 and outer piston 27. Mounted in extension 40 is a projecting pin or axle 41, on which is journaled a pulley 42, shown as provided with three peripheral V-shaped grooves 43. Pulley 42 is freely rotatable on axle 41, being retained thereon by nut 44, which is received on the outer threaded end of the axle.

Mounted directly on drive shaft 18, for example on the conventional rear pinion gear shaft which protrudes from the differential housing 19 and forms part of the drive to the rear wheels, is a pulley 47, which has three corresponding V-shaped grooves 48, formed therein. Pulley 47 is fixed to drive shaft extension 18 to rotate therewith, being shown as bolted thereto at 47'. Endless flexible members, shown as V-shaped rubberized fabric belts 49 interconnect pulleys 47 and 42 when pulley 42 is lowered by the lifting mechanism to elevate the vehicle.

In accordance with the present invention, crank case oil is utilized as the fluid medium for lowering pistons 27 and 32 and for elevating the rear end of the vehicle. As shown more particularly in Figs. 1 and 2, a conventional type of gear pump having the usual or slightly higher pressure of discharge, provided with casing 50, and intermeshing pumping gears 51 and 52, is mounted within the crank case 17. Shaft 53 on which is keyed gear 52 is extended beyond its bearing in the gear housing 50 to the exterior thereof, and carries a gear 54 which meshes with a gear formed on the flywheel 16. Consequently when the engine 15 is operated, the gear pump is driven to draw in oil from the bottom of the crank case through the suction intake 55 of the pump and discharge it under pressure through the outlet 56. The pump is provided in customary manner with a safety valve and by-pass bleeder 56' to avoid excess pressure.

A pipe 57 connects outlet 56 to a valve casing 58, mounted on the dash 21. Any suitable type of valve control can be employed, that shown being a rotary cylindrical valve 59, journaled in the oil tight valve casing 58. Valve 59 is provided with a stem 60 which extends out through the front of the casing and is connected to a control handle 61, for manual control thereof. Pipe 57 is connected to the rear end of the valve casing 58 in liquid tight relationship, and is positioned adjacent the periphery of the rear face of valve 59 in the relationship indicated in Fig. 5. Also connected to and opening through the rear end wall of valve casing 58 is a pipe 63, which extends rearwardly to the lifting cylinder, pipe 63 being connected at an angular relationship of approximately 90° from the connection of pipe 57. Valve disk 59 is formed in the rear face thereof with a channel 64 extending from points on the periphery thereof which are displaced approximately 90° in angular relationship. Consequently, in one position of the valve, channel 64 interconnects pipe 57 with pipe 63 to thereby supply fluid under pressure from the gear pump to the lifting cylinder.

Also connected to the rear end of valve casing 58 at a point diametrically opposite the connection of pipe 57, is a pipe 66 which leads from the valve casing back to and discharges within the crank case as indicated at 67. Pipe connection 66 is thus disposed in an angular spacing of 180° from pipe 57, and of 90° from pipe 63. By turning valve 59 through an angle of 90°, the connection between the pump and the lifting cylinder is thus cut off, and the lifting cylinder is thereby connected through pipe 63 and channel 64 with the exhaust pipe 66, which allows the oil trapped in the system under pressure to flow back to the transmission housing. The face and periphery of valve 59 have a ground liquid-tight fit with the cooperating portions of the valve casing 58, so that flow of oil is prevented except when channel 64 interconnects two of the pipes. By turning valve 59 further in the same direction, the valve then cuts off communication between any two of the pipes, and this is the position generally employed during normal operation of the vehicle. Suitable indicating marks or spring detent stops, can be provided in well-known manner for rendering the turning of the control handle to the 3 operating positions of the valve, easy and certain.

The rear end of pipe 63 is supported by a mounting 70 on the side of cylinder 25, and is interconnected by a flexible tube 71, with a pipe connection 72 mounted in the lower end of the shaft extension 39 of inner piston 32 in communication with a passageway 73 extending upwardly through the skirt or side wall of the piston and opening at 74 into the space between the top of inner piston 32 and the under side of outer piston 27. Thus when valve 59 is turned to interconnect pipes 57 and 63, and the engine is operated, oil under pressure is supplied to the space between inner and outer pistons 32 and 27, forcing the inner piston 32 downwardly until the shoulder 34 contacts with the annular seat 35, or until a passage 76 is uncovered. As inner piston 32 nears the end of its downward movement, it uncovers a passage 76 in the inner wall of outer piston 27. Passage 76 communicates with a vertically extending passage 77 extending upwardly through the skirt or side wall of outer piston 27, and opening as indicated at 78 into the space between the top of piston 27 and the under side of cylinder 25. Thus after lowering movement of the inner piston 32 to uncover port 76, oil under pressure is then supplied from the accumulation between inner and outer pistons 32 and 27 through passages 76 and 77 to the space between the outer piston and the cylinder, thereby forcing the outer piston 27 downwardly until shoulder 30 contacts with annular seat 29. During the lowering movement of outer piston 27, the inner piston 32 remains extended from the lower end of the outer piston and moves downwardly along with the outer piston. The extension of the pistons is thus effected in seriatim.

During this lowering movement of the pistons, pulley 42 with belts 49 in place about the lower ends of the grooves 43, is moved downwardly until the outer flat surfaces 80 of the belts, which protrude somewhat beyond the outer extremities of the V's of the pulley, contact with the ground. Further lowering movement of the pistons then raises the rear vehicle wheels 13 from the ground to a position such as indicated in Fig. 2, the rear end of the vehicle then being supported on the three flexible belts 49, functioning as tires. The stroke of the pistons is so coordinated with the mounting of the cylinder and piston assembly upon the axle or differential housing of the car that the extension of both pistons is sufficient to effect a raising of the vehicle to remove the wheels from the ground as shown. Due to the double extensible piston construction shown, a cylinder and pistons of comparatively small length can be employed to give substantial lifting action and the entire unit can be mounted in collapsed or nonextended position at an elevation on the vehicle to give substantial ground clearance, as well as body clearance with relation to the movable parts of the chassis, for example as much as is afforded in the conventional mounting of the differential and rear axle housings of the vehicle. Cylinder 25 can be mounted at a small angle, such as 1° to 3°, if necessary, so that in the operative position of the device, pulley 42 will lie directly beneath the drive shaft or the center of weight of the rear end of the vehicle.

When the pistons are extended to raise the vehicle, the flexible belts 49 are drawn taut or tensioned about the pulleys 47 and 42, as shown in Figs. 1 and 2. The lengths of the belts are coordinated with the positioning of the pulleys and the stroke of the pistons so as to be in proper engagement with the drive pulley 47 to be driven thereby only when the pistons are extended and the vehicle is raised. When the pistons are moved back within the cylinder to their inoperative position for the normal running of the vehicle, as shown in Figs. 3 and 4, considerable slack is provided in the belts 49 in view of the lessening of the distance between the axes of the pulleys. In order to take up this slack and hold the driving belt at all times taut about the lower pulley 42, there is provided a lever 83, pivotally mounted at 84 on the side of the differential housing 19 intermediate the vertical planes passing through the centers of the respective pulleys. (See Fig. 4.) A plurality of such levers can be employed, but one is sufficient in the construction shown. The lever is provided with three V-shaped grooves 85 adjacent one end thereof, adapted to receive and support the upper portions of belts 49 in the reach of the belts extending between the two pulleys.

The lever 83 is provided with an arm 86 at the side of the pivot 84 opposite from the belt-receiving grooves 85, to which is attached a spring means normally urging the lever to swing about pivot 84 so as to raise the grooved end 85 and lift belts 49 from driving contact with pulley 47, and to take up any slack in the belts so as to hold them taut about lower pulley 42 and keep them properly supported and lifted out of the way during normal operation of the vehicle. This position of lever 83 and belts 49 is shown in full lines in Figs. 3 and 4, and the position of the lever when the vehicle is lifted is shown in dotted lines in Fig. 3. The hydraulic force of the lifting mechanism overcomes the action of the spring means as the grooved end 85 of the lever is pulled downwardly by the tightening of the belts during the lifting operation of the vehicle. As shown, arm 86 is provided with a slot or hole 89 near the end thereof through which loosely passes a rod 90 carrying spaced nuts or washers 91 and 92 above and below the lever for retaining the lever in place and forming an adjustment device for the movement of the lever. On the upper end of rod 90 is an enlarged end 93 which slides in a housing 94 attached to the rear axle housing. A compression spring 95 is mounted within housing 94 between the upper end of the housing and the top of rod end 93 and urges the lever toward the full line position shown in Fig. 3. The slot 89 is of sufficient extent to allow for the pivoted movement of the lever with translational movement of rod 90.

When the valve 59 is turned to connect pipe 63 with exhaust pipe 66, the weight of the vehicle will force the oil from the cylinders back to the crank case housing, and due to the size of the pipes the lowering action will be gradual so that the rear wheels of the car will not come down with an objectionable jar. To complete the raising of the pistons to inoperative position, there is provided a strong tension spring 100, mounted in a casing 101, fastened to the wall of differential housing 19, the spring being connected at its lower end to a rod 103 and at its upper end to a block 102 fastened to or formed as a part of the top of casing 101. Rod 103 is fastened at its lower end as indicated at 104 to an outwardly extending arm 105 connected to or integral with the extension shaft 39 of inner piston 32. Spring 100 is of sufficient tensional strength to force the oil first from the space between the cylinder and the outer piston to allow raising of the outer piston with the inner piston carried in extended relationship from the lower end thereof, and then force the oil from between the inner and outer pistons, to thereby return the assembly to inoperative position.

In operation, when it is desired to park the vehicle in a limited space, the operator can run the car in at an angle so that the front wheels are in the approximate parked position. The gear shift lever 22 then being in neutral position with the motor 15 running, the operator turns valve 59 to connect pipes 57 and 63 so that the pump forces oil to the lifting cylinder to extend the pistons. During this movement the belts 49 are automatically positioned and tensioned about pulleys 47 and 42, the rear wheels of the car being lifted from the ground and the rear of the car being supported upon the flat surfaces 80 of the belts protruding from the bottom of pulley 42. The operator then moves the gear shift lever either into first speed or reverse, depending on the direction of rotation of the drive shaft of the car. Normally to park on the right hand side of the street, this will be accomplished by moving the lever into the reverse speed, which will connect the running engine to the drive shaft and thereby rotate pulley 47 to drive belts 49. This will give a wrapping action of the belts about the lower pulley 42, much in the nature of a tractor drive, affording high traction and at the same time providing a resilient or cushioned movement of the car over obstructions or rough surfaces. This will swing the rear end of the car about a pivot point intermediate to the front wheels and thus bring the car into the curb. When the car has been swung inwardly to the desired extent, it is only necessary to throw in the usual clutch or move the gear shift lever into neutral, and perhaps apply the usual car brake, whereupon the drive shaft will be quickly stopped, and due to the tension in the belts 49, an automatic braking action on the parking wheel will result.

If desired, the car can be left in elevated position when parked. This may be done by turning valve 59 to a shut-off position, which will hold the fluid pressure within the lifting cylinder when the ignition is cut off and the engine is stopped. Or the car may be lowered to normal position in the parking space by simply turning valve 59 to connect pipe 63 with exhaust pipe 66, whereupon the pistons will be returned to their inoperative position, and belts 49 will be automatically withdrawn from driving contact with pulley 47. When it is desired to move the car out of a parked position, the same operation is followed, except that the gear shift lever in this instance will be moved into the reverse of the former position so as to drive the belts in the opposite direction.

The present invention possesses many advantages as to simplicity and economy in construction, as standard parts including pulleys, driving belts, and hydraulic cylinders, can be used. The mechanism is light in weight, which is of prime importance in a vehicle of this character. It is simply controlled, having only one additional control valve easily operated from the driver's compartment in addition to the usual controls of the car. The use and installation of expensive gearing and clutches are entirely obviated. Special shaft and gearing connections to the drive shaft of the car are also eliminated by the direct drive in which the driving pulley is easily installed directly on the drive shaft or the exterior of the customary housings. The car supplies its own motive power for the lifting and propelling operations, and supplies its own motive fluid for the hydraulic cylinders from a source of supply which is inherent in the construction of modern vehicles, thereby eliminating special reservoirs, storage tanks and their accessory equipment.

In Figs 6–14 inclusive is shown a somewhat modified form of device. Referring more particularly to Figs. 6 and 7, the frame of the vehicle is indicated at 10', with rear axle at 11', engine at 15', operating crank shaft at 14', which drives through conventional change speed gearing, mounted in transmission housing 17ᵃ, under the control of a gear shift lever 22' and clutch pedal 22ᵃ in the customary manner, to a drive shaft 18'. The latter drives through conventional differential mechanism mounted within differential housing 19' to the rear wheels indicated at 13'.

Pivot lugs 110 are mounted on opposite sides of the differential housing 19', somewhat below the horizontal center line thereof. Pivotally mounted on these lugs are arms 111 which are rigidly fastened to an inner annular race 112 (Fig. 12). Each arm 111 carries a bearing sleeve 113 which rotatably receives lug 110. On its outer periphery, inner race 112 is provided with a semi-circular raceway 114. Surrounding inner race 112 and concentric therewith is an outer race 116, which on its inner periphery is formed with a semi-circular raceway 117. Mounted between races 112 and 116 are a plurality of ball bearings 118 for rotatably supporting the outer race 116 with respect to the inner race 112. Any suitable form of roller or plain bearings can be employed. Suitable ball bearing guides and holders or spacers are indicated at 119. Threaded into the inner race 112 is a key or plug 120 (Fig. 14) having an opening 121 in the outer end thereof for the reception of a pin or tool for facilitating insertion of the plug into position and its removal therefrom. Upon assembly of the parts, balls 118 are inserted through the opening provided by removal of plug 120 and forced about the annular raceway together with the spacers therefor, and then plug 120 is mounted in place. Plug 120 also is provided with a semi-circular raceway 122, and with a locating hole 123 in the opposite end thereof, through which is passed a pin 124 mounted in an arm 125 rigidly carried by inner race 112, to thereby maintain plug 120 in proper position.

Outer race 116 is provided with a ring gear 127 and with a ground engaging surface 128 extending at an angle to the outer surfaces of the gear teeth. As shown, an angle of approximately 24° gives very satisfactory results with the construction illustrated, although this can be varied. Inner race 112 is constructed as indicated at 129 to provide a large annular open space. The outer and inner annular races are thus pivotally mounted upon the differential housing to swing from an inoperative position shown in full lines in Figs. 6 and 7, to a generally upright position shown in dotted lines in Fig. 7. In the upper inoperative position, the races thus surround the lower portion of the differential housing and thereby maintain substantially the ground clearance which is afforded by the differential housing of the car. As the differential housing is generally about the lowest portion of the frame of the car, it forms an advantageous mounting for the lifting mechanism, enabling parts of smaller over-all size and weight to be utilized and still obtain the desired lifting effect.

Pivotally connected to inner race 112 at the side opposite the pivotal mounting 110, as indicated at the opening 131, is a rod 132, which is pivotally fastened at its opposite end, indicated at 133, to an arm 134, rigidly mounted at 135 to a protruding portion of a piston rod 136, carrying a piston 137, mounted within a hydraulic cylinder 138, fastened to frame 10'.

Pressure fluid, which may be air, is supplied to the cylinder by pump 140, which is connected to and driven by the crank shaft 14' through a conventional gear train (not shown), so as to be operated when the engine 15' runs. This may be the usual air pump which is conventional equipment on certain cars for pumping air to deflated tires or other desired purpose. Such pump is generally equipped with a throw out for disconnecting it from the drive when not in use. A pipe 141 connects the discharge side of the pump with a valve casing 142, within which is mounted a cylindrical plug valve 143, having a stem 144 which extends to the exterior of the casing for manipulation by handle 145. The valve casing is preferably mounted on the inner side of the dash 21' so as to be under the control of the driver of the vehicle. Valve 143 is provided with a cored passage or channel 147, affording communication in one position of the valve with a pipe 148 opening into one end of cylinder 138 as indicated at 149. The opposite end of cylinder 138 is connected by a pipe 150 to the valve casing, and this in turn is connected by channel 151 formed in valve 143 with an exhaust port 152, formed in the valve casing. Pipes 148, 141, 150 and exhaust port 152 are arranged about the valve casing at an angular displacement of 90°, as shown in Fig. 11. In one position of the valve, that shown in Fig. 11, pressure air is thus supplied to the left-hand side of piston 137, as shown in Figs. 7 and 10, while the right-hand side of the piston is connected to exhaust to atmosphere. By shifting valve 143 clockwise as shown in Fig. 11 through an angle of 90°, channel 147 will then connect the pump with pipe 150 to supply pressure air to the right-hand side of piston 137, while the left-hand side of the piston will be connected by pipe 148 and channel 151 to the exhaust port 152.

Thus when the operator turns the control handle 145 to move valve 143 to the position shown in Fig. 11, piston 137 is moved to the right-hand end of the cylinder, thereby carrying to the right the piston rod 136, and arm 134, and serving to swing the annular races through the agency of the rod 132 from the inoperative position to the lifting position. Mounted on arm 125 carried by inner race 112, is a cylinder 155, carrying a movable piston 156. An annular threaded ring 157 fastened to cylinder 155 cooperates with a shoulder 158 on piston 156 to limit movement of the piston in one direction, the head of the cylinder limiting movement in the opposite direction. Skirt 159 of piston 156 is hollow as indicated at 160, and within the hollowed out portion is fastened an axle or pin 161 on which is rotatably mounted a roller 162. The space 163 between piston 156 and the head of cylinder 155 is normally under atmospheric pressure through the agency of a vent 164. Over the vent is fastened a relief casing 165 containing a very fine pin hole, to thereby restrict the escape of air from space 163 upon compressive movement of the piston.

A series of coiled springs 167, mounted between the head of the cylinder and spring receiving sockets 168 in the upper end of the piston, normally urge the piston outwardly toward the end of its stroke and allow space 163 to fill with air under atmospheric pressure. Springs 167 also serve to maintain piston 156 against rotational movement within the cylinder, so that roller 162 is disposed in proper operating position.

Cylinder 155 is so mounted on inner race 112, that when the piston 156 is toward the outer end of its stroke, for example, the position shown in Fig. 8, roller 162 will first contact with the ground as the races are swung to lifting position. It will be noted that the races form an auxiliary wheel which in its raised or inoperative position is in a generally horizontal plane, and in its lowered or operative position is in a generally vertical position with its axis of rotation approaching parallelism with the longitudinal axis of the vehicle, while the plane in which the outer race turns is approximately at 90° to that of the usual or normal running wheels of the vehicle.

Axis 161 of roller 162 is mounted generally parallel with the rear axle 11' of the car, so that a free rolling movement of roller 162 is afforded when it contacts with the ground upon swinging movement of the races. As the races are moved further into elevated position under the action of hydraulic cylinder 138 and connecting rod 132, weight of the car is imposed on roller 162 and piston 156, giving a compressive movement of the piston within cylinder 155. As the escape of air, which is now compressed in space 163, is materially restricted by the orifice in member 165, piston 156 is maintained sufficiently toward the outer end of its stroke by the combined force of the compressed air and springs 167, as to entirely support the weight of the rear end of the vehicle until the races are moved completely into the operative elevated position, shown in dotted lines in Fig. 7. The gradual escape of air then allows piston 156 to gradually move upwardly within cylinder 155 until finally the weight of the car is transferred from roller 162 to the ground engaging surface 128 of outer race 116. The hydraulic cylinder carried at the lower end of the auxiliary wheel thus not only cushions the impact of the wheel with the ground but also allows a gradual movement of the auxiliary wheel into contact with the ground under the weight imposed by the vehicle. Roller 162 at the same time affords an easy frictionless rolling movement of the auxiliary wheel into the lifting position.

Mounted directly on drive shaft 18' in advance of the differential housing 19' is a pinion gear 170, which rotates with the drive shaft. The pivotal mounting of the annular races, and the location of the ring gear 127 on the outer race is such that gear 127 is automatically brought into proper driving mesh with pinion 170 as the lifting device is moved to raise the vehicle. The freedom of the outer race to turn when first engaging the outer part of the gear teeth will prevent any binding of the gears, especially if the gears are made with a full tooth instead of the stub section. The action of the hydraulic force in cylinder 138 serves to maintain the lifting device in its raised position. Motive power to rotate annular race 116 about inner race 112 is then under the control of the operator through the usual clutch control 22a and gear shift lever 22' to operate the drive shaft from the engine and thereby rotate the fifth wheel to cause a swinging or parking movement of the rear end of the vehicle. The mounting of the outer race is such as to provide a frictionless rolling contact on the antifriction bearings 116, while at the same time the rolling movement can be quickly terminated by stopping the operation of the drive shaft, such as by throwing out the clutch 22a, or shifting the gear shift lever 22' into neutral, and applying the usual car brake if necessary, the engagement of the gear teeth of pinion 170 with the teeth of ring gear 127 providing a positive braking or stopping action for the rotation of the annular outer race.

It will be noted that in the operative or raised positions of the races, they extend at an angle to the vertical, although the ground engaging surface 128 of the outer race is in flat contact with the ground. The construction is such that the gear teeth 127 are maintained at all times out of contact with the ground. Moreover, this angular inclination is instrumental in lessening the force required to move the races from operative position toward inoperative position under the action of the hydraulic cylinder 138, when the valve 143 is reversed. Of course, fluid connections could be provided to cylinder 155 to positively force piston 156 downwardly to again raise the vehicle onto roller 162. However, this is not necessary with the construction shown, as the weight of the car itself tends to swing the races about their pivot points 110 and so to allow the wheels 13' to come into contact with the ground. The initial force of the hydraulic fluid in cylinder 138, tending to force piston 137 toward the left, (as shown in Fig. 7) is sufficient to initiate a tilting movement about the forward edge of the ground engaging surface 128, and the weight of the car then accelerates this movement to bring the rear wheels of the car back into contact with the ground. The movement of the piston 137 back to the left end of the cylinder 138 then raises the lifting mechanism to the inoperative position.

In order to maintain the lifting mechanism in its inoperative position with a resilient mounting, and to return or assist in returning the mechanism to inoperative position, a spring 172 is provided, one end of which is connected at 173 to a portion of the frame 10', and the other end connected to a cable 174, which passes around a pulley 175, mounted on a bracket 176, carried by the differential housing 19'. The end of the cable 174 is connected as shown at 177 to a portion of the inner race 112, for example to an eyelet on the hydraulic cylinder 155. If desired, when the parts have been returned to their inoperative position, valve 143 can be turned to an intermediate position which cuts off communication of the pump with all pipes of the lifting mechanism.

The operation of this form of the invention is thought apparent from the above description. As in the previous case, the car to be parked is run in at an angle with the front wheels adjacent the curb. With the engine running, the operator then moves the control lever 145 of valve 143 to actuate the lifting mechanism to raised position, which automatically connects the direct drive to the fifth wheel with the drive shaft. Then by actuation of the clutch and gear shift lever, the drive shaft is interconnected with the engine to thereby rotate the fifth wheel and swing the rear end of the vehicle into parked position.

The two embodiments of the invention shown herein have in common marked simplicity in construction, compactness, a minimum of weight, and freedom from unnecessary complication of parts which are likely to get out of repair. Both forms afford unusual ease of control on the part of the operator, having only one valve in addition to the normal controls of the car; utilize a direct drive for the parking wheel, which is automatically brought into driven relationship with the drive shaft upon actuation of the lifting mechanism, and automatically disconnected from driven relationship therewith on movement of the lifting mechanism to inoperative position, together with means for resiliently holding the parts in inoperative position to avoid rattle, and maintain ground clearance.

While the lifting and parking mechanism is illustrated for the rear wheels of the car, it is obvious that the mechanism can be installed on the front frame or axle to elevate the front wheels, or on both the front and rear, if desired.

In Figs. 15, 15a and 16 is shown a somewhat modified form of the invention, in which the lifting and propelling mechanism is supported by the frame of the car, rather than on the differential housings or axle housings, to suit the school of thought in automotive construction that demands little or no sprung weight that is not essential. As shown, the lifting hydraulic cylinder 25ª, is identical with the construction shown in Figs. 1 to 5, as are also the constructions of the belt drive from the pulley of the hydraulic cylinder to the drive shaft, the belt carrying lever, the spring return for the pistons, and the hydraulic circuit and control therefor. The hydraulic cylinder is fastened at 180 to the frame 10ª adjacent the differential housing 19ª and rear axle 11ª so as to extend at a small angle from the vertical as previously described. In order to interconnect the frame with the differential housing or axle to prevent relative movement therebetween when the hydraulic lift is actuated, an automatic lock between these parts is provided.

As shown, a V-shaped locking bar 182 is pivoted at 183 to the side of the rear axle housing 11ª. Attached to one end of the V-bar is a rod forming an armature 184, which cooperates with a solenoid coil 185 mounted within a suitable casing (not shown) on the rear axle 11ª. The bar is normally urged by a spring 186 toward the rear axle 11ª, so as to swing the opposite end 187 of the bar to the dotted line position. When coil 185 is energized, this overcomes the force of spring 186 and swings the bar about the pivot 183 to the full line position shown, in which the arm 187 enters a slot 188 between a series of lugs 189, carried by the wall of cylinder 25ª, thereby locking the cylinder and frame to the differential housing and rear axle so that these parts are elevated in unison.

As a convenient means for automatically actuating this locking member when the lift mechanism is utilized, a switch in the circuit of solenoid coil 185 is mounted on the valve casing 58ª which controls the supply of fluid to hydraulic cylinder 25ª. Valve stem 60ª carries a contact 190 which is rotated into engagement with a contact 191 mounted on the face of the valve casing, as the control handle 61ª is turned so as to supply fluid to the hydraulic cylinder to effect the lifting operation. A lead 192 from the usual car battery 193, or other suitable electrical system of the vehicle, is connected to contact 191. A lead 194 leads from contact 190 to the coil 185, the latter being grounded to the frame. Consequently, as soon as the lifting operation is initiated, and before the pistons are extended sufficiently to start elevating the vehicle, the electrical connection to the solenoid is completed, and the frame and axle are locked for the lifting operation. The series of lugs are so located that the locking bar normally enters the slot between one pair of lugs when the rear seat of the vehicle is not occupied or the car is not loaded, and enters the slot between another pair of lugs when the car is loaded. Should the bar happen to contact with the edge of an intermediate lug, the bar will slide into proper position within the slot when the lifting mechanism has effected a slight elevation of the vehicle. Should the valve control 61ᵃ be turned to break the electrical circuit to the solenoid at the time the vehicle is lifted, the pull of the lifting force exerted between lug 189 and the V-bar 182 holds the parts in the locked position against the action of spring 186. As soon as the car is lowered to restore the parts to their normal relationship, this lifting force is removed, and spring 186 then returns the V-bar to the dotted line or released position, where it is maintained during the normal operation of the vehicle.

While the forms of invention herein disclosed constitute preferred embodiments thereof it is to be understood that the invention is not limited to these precise forms, and that changes may be made therein without departing from the scope of the invention which is defined in the appended claims.

What is claimed is:

1. In a vehicle lifting mechanism for a vehicle having a frame, a cylinder supported by the frame, an outer piston movable within the cylinder, an inner piston movable within the outer piston, a vehicle supporting member carried by the inner piston, means for supplying fluid under pressure between the inner and outer pistons, to force the inner piston downwardly, and a passage in the outer piston opening at one end within the interior thereof at a position to be uncovered by the inner piston when the inner piston approaches the end of its stroke, said passage opening at its other end on the exterior of the outer piston at a position to supply fluid under pressure between the outer piston and the cylinder to thereby force the outer piston together with the inner piston carried thereby downwardly to raise the vehicle.

2. In a lifting and propelling mechanism for a vehicle having a frame, and a drive shaft supported by said frame; a vehicle supporting member, means for lifting said vehicle on said supporting member, a flexible endless member for interconnecting said supporting member in driven relationship with said drive shaft for propelling said vehicle when lifted on the supporting member, and means for automatically positioning said flexible endless member in driving relationship with drive shaft and supporting member as said vehicle is lifted onto said supporting member.

3. In a lifting and propelling device for a vehicle having a drive shaft, means for lifting the vehicle, and means for moving the vehicle when so lifted, comprising an endless flexible member driven from said drive shaft, said flexible member serving as a tire for supporting the vehicle in lifted position and during movement thereof.

4. In a lifting and propelling device for a vehicle having a drive shaft, means for lifting the vehicle including a member having a pulley adjacent the lower end thereof, and means for moving the vehicle when so lifted, comprising an endless flexible member engaging said drive shaft to be driven thereby, said flexible member having a wrapping action about said pulley and being interposed between said pulley and the ground to serve as a tire for supporting the vehicle in lifted position and as a traction means for propelling the vehicle in lifted position.

5. In a lifting and propelling device for a vehicle having a drive shaft, means for lifting the vehicle, means for moving the vehicle when so lifted, comprising an endless flexible member connected to said drive shaft to be driven thereby, and means for bodily shifting the endless flexible member from driven relationship with said drive shaft to thereby break the driving connection, said shifting means including mechanism for holding said endless flexible member taut when thus bodily removed.

6. In a lifting and propelling device for a vehicle having a drive shaft, means movable from an inoperative position in which the vehicle is supported on its normal running wheels to an operative position in which wheels of the vehicle are lifted from contact with the ground, means for moving the vehicle when so lifted, comprising an endless flexible member connected to said drive shaft to be driven thereby, and means for bodily removing said flexible member from driven relationship with said drive shaft as said lifting means is moved from operative to inoperative position, said last-mentioned means including mechanism for holding said endless flexible member taut when thus bodily removed.

7. In a lifting and propelling device for a vehicle having a differential housing and driven shaft protruding therefrom, means mounted on the vehicle adjacent the differential housing for lifting the rear end of the vehicle including extensible members, said members interfitting one within another in collapsed positions thereof, and extending one from the other in lifting position thereof, a propelling device carried by the extensible member which is lowermost in the lifting position of said members, a driving connection between said protruding shaft and said propeller device for driving said propelling device to propel said vehicle in lifted position thereof, and means for automatically breaking said driving connection when said extensible members are moved to collapsed positions thereof.

8. In a lifting and propelling mechanism for a vehicle having a final drive housing and a driven member protruding therefrom; lifting means for the vehicle including an annular member pivoted to swing from an inoperative position surrounding the lower portion of said housing, to an upright position supporting said vehicle from the ground, said annular member supporting a relatively movable portion which is automatically brought into driven relationship with said driven member as said annular member is swung from inoperative to upright position, said relatively movable portion of the annular member having a ground engaging surface for propelling the vehicle when so lifted.

9. In a lifting and propelling mechanism for a vehicle having a frame, an annular inner race pivoted to said frame to swing from an inoperative position to an upright position lifting said vehicle, an annular outer race, and anti-friction bearings for rotatably supporting said outer race upon said inner race, said outer race having a ground engaging portion, and means for rotating said outer race to propel said vehicle.

10. In a lifting mechanism for a vehicle having a frame, a movable mechanism carried by the frame for engaging the ground and lifting the vehicle thereon, and a hydraulic cushioning member carried at the lower end of said movable mechanism adapted to first contact with the ground and then allow said mechanism to gradually come into contact with the ground as weight of the vehicle is imposed thereon.

11. In a lifting mechanism for a vehicle having a frame, a movable mechanism carried by the frame for engaging the ground and lifting the vehicle thereon, a cylinder carried at the lower end of said movable mechanism, a movable piston therein adapted to first engage the ground upon the actuation of said movable mechanism to lift the vehicle, and means for restricting the escape of fluid from said cylinder upon movement of the piston to thereby cushion the contact of said movable member with the ground and allow said movable member to gradually come into contact with the ground as weight of the vehicle is imposed thereon.

12. In a lifting mechanism for a vehicle having a frame, a movable member supported by said frame and movable from an inoperative position to a position supporting the weight of the vehicle thereon, hydraulic means for actuating said movable member, and an additional hydraulic means carried by said movable member and adapted to first engage the ground to cushion the contact of said movable member with the ground and to allow the movable member to gradually come into contact with the ground as weight of the vehicle is imposed thereon.

13. In a lifting and propelling mechanism for a vehicle having a frame, an inner race pivotally supported from said frame to swing from an inoperative to an upright position, an outer race, anti-friction bearings rotatably supporting said outer race upon said inner race, hydraulic cushioning means carried by said inner race, a roller pivotally mounted on said hydraulic cushioning means and adapted to first contact with the ground as said races are swung from inoperative to upright position and to allow the outer race to gradually come into contact with the ground when moved to upright position, and means for rotating said outer race to propel said vehicle.

14. In a lifting and propelling device for a vehicle having an engine and a member driven therefrom, means for lifting the vehicle, and means for moving the vehicle when so lifted, comprising a flexible resilient member having a driven engagement with said engine driven member, said flexible member serving as a resilient and cushioning support for said vehicle in lifted position and during movement thereof.

15. In a lifting and propelling device for a vehicle having an engine and a member driven therefrom, means for lifting the vehicle including a rotatable member adjacent the lower end thereof, and means for moving the vehicle when so lifted, comprising a flexible resilient member having a driven engagement with said engine driven member, said flexible resilient member having a wrapping action about said rotatable member and being interposed between said rotatable member and the ground to serve as a resilient and cushioning support for said vehicle in lifted position and as a traction means for propelling the vehicle in lifted position.

16. In a lifting and propelling device for a vehicle having an engine and a member driven therefrom, means for lifting the vehicle, means for moving the vehicle when so lifted, comprising a flexible resilient member having a driven engagement with said engine driven member and forming a cushioning support and traction means for the vehicle in lifted position, and means for removing said flexible resilient member from driven engagement with the engine driven member as said lifting means is operated to lower the vehicle from lifted position thereof.

17. In a lifting and propelling device for a vehicle, means for lifting the vehicle, and means for moving the vehicle when so lifted comprising a driven member, and a flexible resilient member having a driven engagement with said driven member and forming a cushioning support and traction means for the vehicle in lifted position thereof.

18. In a lifting and propelling device for a vehicle having an engine and a member driven thereby, a pulley having a V-shaped groove interconnected with said member to be driven thereby, means for lifting the vehicle including a pulley having a corresponding V-shaped groove formed therein, and a V-shaped belt interconnecting said first mentioned pulley in driving relationship with said second mentioned pulley when the vehicle is lifted, said belt having a wrapping action about said second mentioned pulley and being interposed between said second mentioned pulley and the ground to serve as a cushioning support for the vehicle in lifted position and as a traction means for propelling the vehicle in lifted position.

19. In a lifting and propelling device for a vehicle having an engine and a member driven thereby, vertically movable means for lifting the vehicle including a base member, means for moving the vehicle when so lifted comprising an endless flexible member extending about said base member and connected to said driven member to be driven thereby, and means for bodily lifting said endless flexible member out of driven relationship with said driven member as said vertically movable means is returned to inoperative position, said last mentioned means holding said endless flexible member taut in position about said base member in inoperative position of the lifting means.

20. In a lifting and propelling device for a vehicle, lifting means for the vehicle including a member adapted to support the vehicle in lifted position, propelling means for said member to move the vehicle in lifted position thereof, a roller carried by said lifting means adapted to first contact with the ground and provide a rolling movement of the lifting means to lifted position of the vehicle, and a dash pot mounting for said roller to cushion the movement of the vehicle to raised position and then transfer weight of the vehicle from said roller to said supporting member for the propelling operation.

21. In a lifting and propelling mechanism for a vehicle having an engine and a gear driven thereby, an annular inner race pivotally supported from said vehicle to swing from an inoperative position to an upright position, an annular outer race, anti-friction bearings rotatably supporting said outer race from said inner race, a ring gear carried by said outer race and adapted to mesh in driven relationship with said driven gear as said races are swung to upright position, said annular outer race having a ground engagement surface for supporting and propelling said vehicle when driven from said driven gear.

22. In a lifting and propelling mechanism for a vehicle, an auxiliary wheel mounted on said vehicle to move from an inoperative position to a position lifting the vehicle thereon, a cylinder carried by said auxiliary wheel, a piston movably mounted therein and adapted to first engage the ground as said auxiliary wheel is lowered, means restraining the movement of said piston within said cylinder as weight of the vehicle is imposed thereon to thereby cushion the contact of said auxiliary wheel with the ground and to allow the auxiliary wheel to gradually come into contact with the ground, and means for driving said auxiliary wheel to propel said vehicle when supported on said auxiliary wheel.

23. In a lifting and propelling mechanism for a vehicle, an auxiliary wheel pivotally supported from said vehicle to swing in a direction generally parallel with the longitudinal axis of the vehicle to an upright position supporting the vehicle thereon, means for positively swinging said auxiliary wheel to upright supporting position, a hydraulic cylinder carried by said auxiliary wheel, a movable piston therein, a rotatable member carried by said piston and adapted to first engage the ground as said auxiliary wheel is swung to supporting position, means for restricting discharge of fluid from said cylinder upon compressive movement of said piston therein, whereby the roller supports the auxiliary wheel out of contact with the ground as the vehicle is lifted thereon until the auxiliary wheel has been swung substantially to upright supporting position, the escape of fluid from the cylinder then allowing the auxiliary wheel to gradually come in contact with the ground, and means for driving the auxiliary wheel to propel the vehicle when supported thereon.

24. In a lifting device for a vehicle having a frame and axle members, lifting means mounted on the frame, a movable locking member carried by the axle members, and a plurality of vertically spaced lugs carried by the lifting means in position to cooperate with said locking member to lock the frame and axle members against relative movement during lifting of the vehicle, the said locking member cooperating with different ones of said lugs depending upon the loading on the frame of the vehicle.

25. In a lifting and propelling mechanism for a vehicle having a drive shaft and differential housing, means for lifting and propelling the rear end of said vehicle including an annular member adapted to have direct contact with said drive shaft and the ground, said annular member being mounted adajacent said differential housing, said lifting and propelling means having provisions for moving said annular member into direct contact with said drive shaft and the ground as said means is actuated to lift the rear end of the vehicle, and means for holding said lifting and propelling means including the annular member in inoperative position.

26. In a lifting and propelling device for a vehicle having a drive shaft with a housing therefor and a drive member on the said shaft, means for lifting one end of the vehicle and means for moving the vehicle when so lifted, comprising an endless annular member directly contacting with said drive member to be driven thereby in lifted position of said vehicle, and simultaneously directly contacting with the ground and providing traction to propel the vehicle along the ground in its lifted position, said endless annular member being mounted to surround a portion of said drive shaft and housing in inoperative position thereof.

27. In a propelling device for a motor vehicle, the combination with a motor vehicle frame, a drive shaft extending longitudinally of the frame, and a housing for a portion of said shaft; of an annular ring member fitting around said housing in one position thereof, and means for moving said annular ring member into another position in which it directly contacts with said drive shaft to be driven thereby, and simultaneously directly contacts with the ground to propel the vehicle.

28. In a parking device for a vehicle having a drive shaft extending longitudinally of the vehicle with a housing therefor, a lifting and propelling mechanism for generally sidewise movement of the vehicle including an endless annular member encompassing the said housing in inoperative position thereof, and means for moving the said endless annular member into position generally transverse of the vehicle in which the said endless annular member is in direct contact with the said drive shaft to be driven thereby, and simultaneously in direct contact with the ground to provide traction for sidewise movement of the vehicle.

THOMAS E. BURKHARDT.